(12) United States Patent
Kaczynski et al.

(10) Patent No.: US 7,712,096 B2
(45) Date of Patent: May 4, 2010

(54) METHOD, SYSTEM, AND STORAGE MEDIUM FOR DYNAMICALLY REORDERING RESOURCE PARTICIPATION IN TWO-PHASE COMMIT TO HEURISTICALLY OPTIMIZE FOR LAST-AGENT OPTIMIZATION

(75) Inventors: Timothy D. Kaczynski, Poughkeepsie, NY (US); Stephen J. Kinder, Hyde Park, NY (US); Matthew J. Sykes, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1533 days.

(21) Appl. No.: 11/018,889

(22) Filed: Dec. 21, 2004

(65) Prior Publication Data

US 2006/0136887 A1 Jun. 22, 2006

(51) Int. Cl.
*G06F 9/46* (2006.01)
*G06F 11/00* (2006.01)

(52) U.S. Cl. .......................... 718/101; 718/104; 714/4; 705/8

(58) Field of Classification Search ................ 718/101, 718/104; 714/4; 705/8
See application file for complete search history.

(56) References Cited

U.S. PATENT DOCUMENTS

| | | | | |
|---|---|---|---|---|
| 5,095,421 | A * | 3/1992 | Freund | 718/101 |
| 5,261,089 | A * | 11/1993 | Coleman et al. | 707/8 |
| 5,673,253 | A | 9/1997 | Shaffer | |
| 5,995,997 | A | 11/1999 | Horvitz | |
| 6,247,038 | B1 * | 6/2001 | Banks et al. | 718/100 |
| 6,338,072 | B1 | 1/2002 | Durand et al. | |
| 6,457,041 | B1 * | 9/2002 | Hutchison | 709/203 |
| 6,542,922 | B1 * | 4/2003 | Chessell et al. | 709/203 |
| 7,165,061 | B2 * | 1/2007 | K et al. | 707/2 |
| 7,266,550 | B2 * | 9/2007 | Dumitru et al. | 707/4 |
| 2003/0149717 | A1 | 8/2003 | Heinzman | |
| 2004/0068501 | A1 | 4/2004 | McGoveran | |
| 2004/0073322 | A1 | 4/2004 | Maenishi et al. | |
| 2004/0153383 | A1 * | 8/2004 | K et al. | 705/35 |
| 2004/0202349 | A1 | 10/2004 | Erol et al. | |

OTHER PUBLICATIONS

Samaras et al., "Two-Phase Commit Optimization and Tradeoffs in the Commercial Environment", 1993, IEEE, pp. 520-529.*
Rahm et al., "Dynamic Multi-Resource Load Balancing in Parallel Database Systems", Proceedings of the 21th VLDB Conference, Zurich, Switzerland, 1995, pp. 395-406.*

* cited by examiner

*Primary Examiner*—Meng-Ai An
*Assistant Examiner*—Kenneth Tang
(74) *Attorney, Agent, or Firm*—Cantor Colburn LLP; Gerry Monteleone

(57) ABSTRACT

A histogram, or resource status history table, for multiple resources is created and maintained. A transaction or resource manager arranges and/or reorders various resources into a sequence based on the histogram such that read-only resources are prepared first and a sole non-read-only resource need not be prepared, but only committed. The transaction manager heuristically determines the order that resources are driven to achieve last-agent optimization. The histogram is kept related to context, based on runtime and applications context to ensure that usage patterns by context are optimized without the need for the installation to know any usage patterns.

15 Claims, 6 Drawing Sheets

METHOD, SYSTEM, AND STORAGE MEDIUM FOR DYNAMICALLY REORDERING RESOURCE PARTICIPATION IN TWO-PHASE COMMIT TO HEURISTICALLY OPTIMIZE FOR LAST-AGENT OPTIMIZATION

BACKGROUND OF THE INVENTION

1. Field of the Invention

The present invention relates generally to transaction processing and, in particular, to last-agent optimization in two-phase commits.

2. Description of Related Art

Any operation involving multiple entities that requires a homogeneous outcome requires some sort of external coordination to ensure that each entity receives the same outcome. A distributed transaction is one example of such an operation. A transaction generally has two possible outcomes: commit or rollback. To ensure that the outcome is homogeneous, a protocol known as two-phase commit is used. An entity that manages transactional resources is known as a resource manager.

In the two-phase commit process, each resource enlisted in the transaction is first asked to prepare to commit and, then, is directed to commit. During the first phase, resource managers confirm that it can successfully complete the commit by replying with an okay value. If all the resources are okay to commit, a log record is written to indicate the outcome and all the resources are committed. If any resource cannot confirm that the commit will succeed, all the resources are rolled back. If the outcome is rollback, no log record is generally written, because the default outcome is rollback (presumed abort). When all the resources execute the same outcome successfully, the outcome is said to be atomic.

A transaction manager is typically responsible for grouping and ordering the resources to be driven. Assuming that each call to prepare, commit, and rollback have to be driven to a subordinate resource over a network, a two-phase transaction results in one log write and 2n number of calls over the network, where n is the number of resources enlisted in the transaction.

If only one resource is enlisted in a transaction, the prepare phase and log write become unnecessary, as there is only one resource and, therefore, the outcome of the transaction will be atomic regardless of whether the prepare call is successful. In this case, the single resource is simply asked to commit, and the overall outcome is commit. If the commit fails, the overall outcome becomes rollback. This optimization is called one-phase commit or only-agent.

There is a need to further optimize the two-phase commit process that collapses select transactions that normally require a two-phase commit to a one-phase commit, (a/k/a last-agent optimization). When asked to prepare, a resource could return a read-only value if the resource has no updates to complete on the subsequent commit or rollback call. If there are n resources enlisted in the transactions, and the first n−1 resources vote read-only on the prepare call, then the remaining resource would become the only resource enlisted and a one-phase commit could be performed on it. This needed optimization is known as a last-agent optimization, because the last resource (or agent) would be able to perform the one-phase commit optimization and still maintain a homogenous outcome for the overall transaction. In this case, the total number of network calls required to commit the transaction would be reduced to n and there would be no need to log after the prepare phase.

BRIEF SUMMARY OF THE INVENTION

The present invention is directed to methods, systems, and storage mediums for dynamically reordering resource participation in two-phase commits to heuristically optimize for last-agent optimization.

A first aspect is a method for last-agent optimization. A connection is established to each resource in a plurality of resources for an application. A current transactional context is determined. Usage statistics associated with each resource are gathered. An order of each resource in the current transactional context is heuristically determined to achieve last-agent optimization based at least in part on the usage statistics. Another aspect is a storage medium storing instructions for performing this method.

Another aspect is a system for last-agent optimization, including a histogram and a transaction manager. The histogram holds usage statistics and history information for each resource in a plurality of resources. The transaction manager orders each resource in a current transaction based at least in part on the histogram so that read-only resources are prepared first and a sole non-read-only resource is committed without being prepared.

Yet another aspect is another system for last-agent optimization, including an application server, a container, a transaction manager, and a connection manager. The application server runs on a general-purpose computer. The container is also hosted on the server. At least one application is running in the container. The application includes at least one transaction using a plurality of resources. The connection manager on the server supplies the resources to the application and enlists the resources with the transaction manager. The transaction manager on the server heuristically orders the resources during a commit phase of a two-phase commit process to achieve last-agent optimization.

Still another aspect is a storage medium storing instructions for performing a method for last-agent optimization, where usage statistics are stored in a histogram. Resources in a current transactional context are ordered using the histogram to achieve last-agent optimization. The ordering is adjusted autonomically to changes in usage.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE INVENTION

Figure 1:
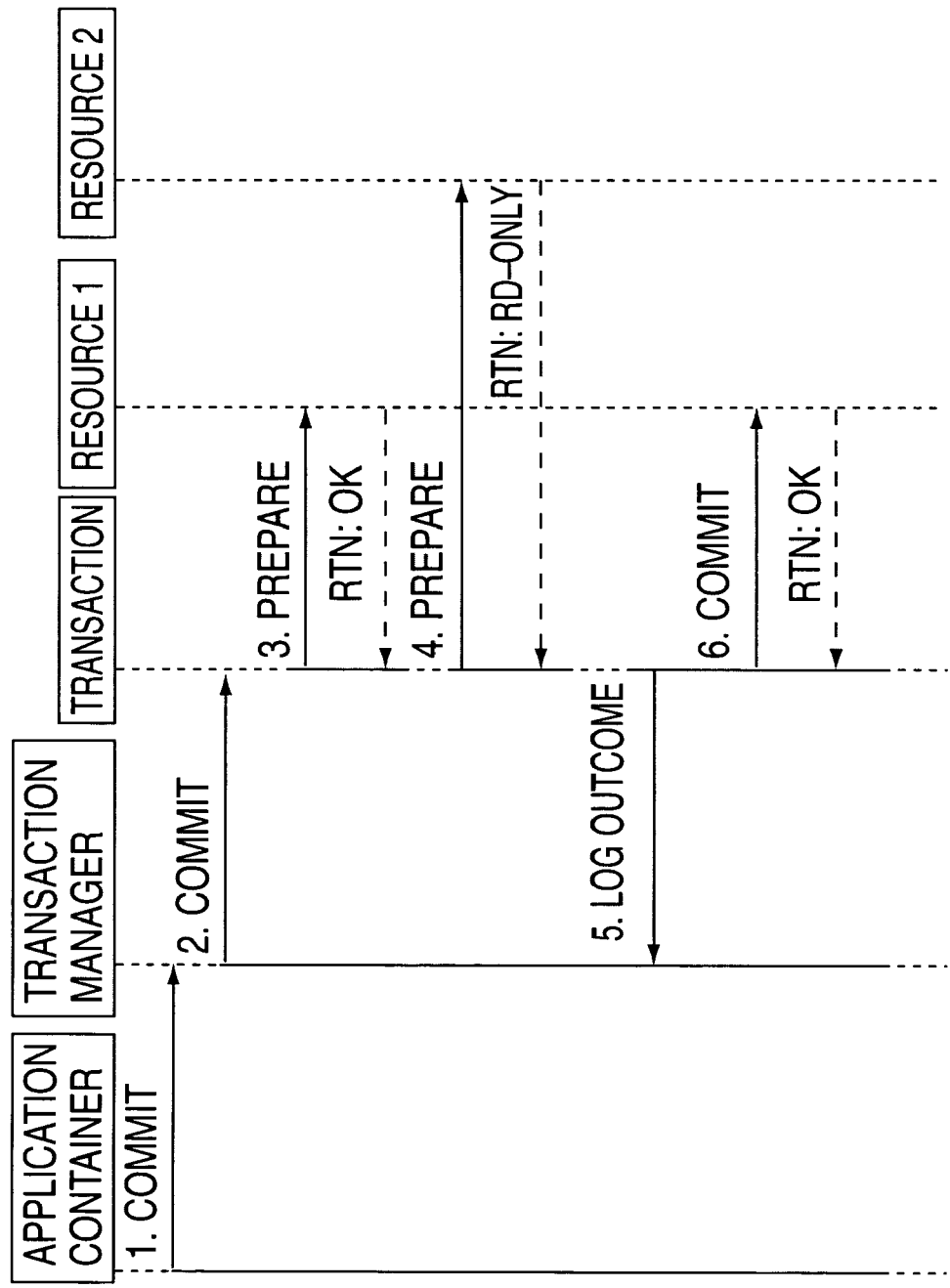
FIG. 1 is a data flow diagram of a prior art example of a two-phase commit process.

FIG. 1 shows a prior art example of a two-phase commit process, where the resources are not ordered for optimal commit. In the first and second steps, the commits from the application container and the application manager flow to the transaction. There are two resources in the transaction. In the third step, the first resource receives a call to prepare and returns okay to the transaction. In the fourth step, the second resource receives a call to prepare and returns read-only to the transaction. That ends the first phase of the two-phase commit. Because one of the resources returned okay, an outcome is logged, in the fifth step, and a commit is flowed, in the sixth step, on that resource (the first resource), to which the first resource returns okay. That ends the second phase of the two-phase commit.

In this example, select transactions that normally require a two-phase commit are reduced to only a one-phase commit. When asked to prepare, a resource returns a read-only value if the resource has no updates to complete on the subsequent commit or rollback call. If there are n resources enlisted in the transactions, and the first n−1 resources vote read-only on the prepare call, then the remaining resource becomes the only resource enlisted and a one-phase commit is performed. This is a last-agent optimization, because the last resource (or agent) is able to perform the one-phase commit optimization. In this case, the total number of network calls required to commit the transaction is reduced to n and there is no need to log after the prepare phase.

A last agent optimization may be performed if all the resources, which are before the last resource, vote read-only. For example, suppose a transaction has n resources enlisted, for n>1. If the first resource votes okay on the prepare call and the remaining n−1 resources vote read-only, then there is only one resource left enlisted in the transaction. However, this resource has already been driven for prepare. A one-phase commit cannot be performed because phase one of the two-phase commit has already executed. The outcome is logged and the remaining resource is driven for commit as the second phase of the two-phase commit. In this case, there are a total of n+1 network calls required to commit the transaction, because one resource is prepared as well as committed.

In this exemplary embodiment, the extra network call and log write are avoidable in the above scenario, if the resources are ordered optimally. If the resource that cannot vote read-only is driven last, the extra network call and log write are not necessary when the last-agent optimization is used.

Figure 2:
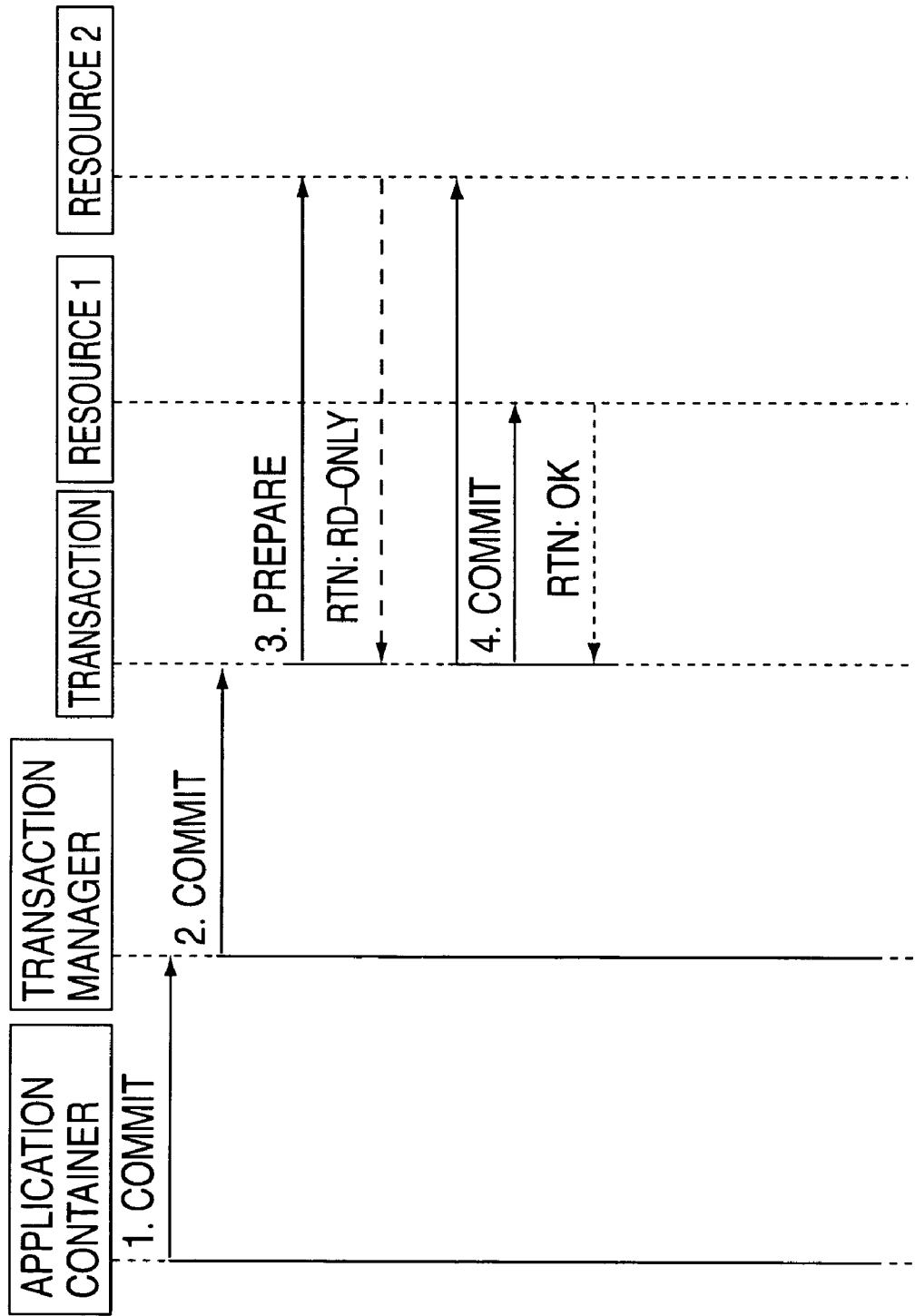
FIG. 2 is a data flow diagram of an exemplary embodiment of an optimized last agent commit process.

FIG. 2 shows an exemplary embodiment of an optimized last agent commit process. The same transaction as shown in FIG. 1 is shown in FIG. 2. However, in FIG. 2 the resources are ordered so that, during the first phase, the second resource is driven first. The second resource returns read-only in response to the call to prepare in the third step. Since there is only one resource left, the first resource, it is driven for commit, in the fourth step, without performing the rest of phase one.

An example of transaction processing is a transfer of finds between a savings account and a checking account. A two-phase commit operation may be used to recover in case there are system failures. Suppose there is a request to transfer $100 from savings to checking. In order to fulfill the request, $100 must be deducted from savings. If $100 is deducted from savings, but the system fails before $100 is credited to checking, then there is a problem. The two-phase commit operation includes notification of resources, (e.g., a savings account manager and a checking account manager) that $100 needs to be transferred from savings to checking and solicits approval from the other resources while storing a record of the transaction for possible recovery. Once there is approval and everything is okay, then the transaction is committed and the resources are obligated to complete the transaction, even if there is a system failure (in which case the stored record is used to complete it after the system restarts).

Last agent optimization may be performed when there is only one updater or one resource left in the transaction. It is not necessary to ask only one resource to commit. Suppose the transaction is a balance inquiry for a savings account, which is a read-only transaction for one resource, the savings account manager. When the savings account manager is asked if it can commit, it responds forget.

An exemplary embodiment automatically determines an order so that any resource likely to vote forget in a given context is polled before any resource likely to vote okay in that context. All the read-only actions are determined first, leaving the committers to the end. The best case is when there is only one committer left. Predictions about whether a resource is likely to vote forget or commit is made based on usage data, which may be displayed in a histogram.

Figure 3:
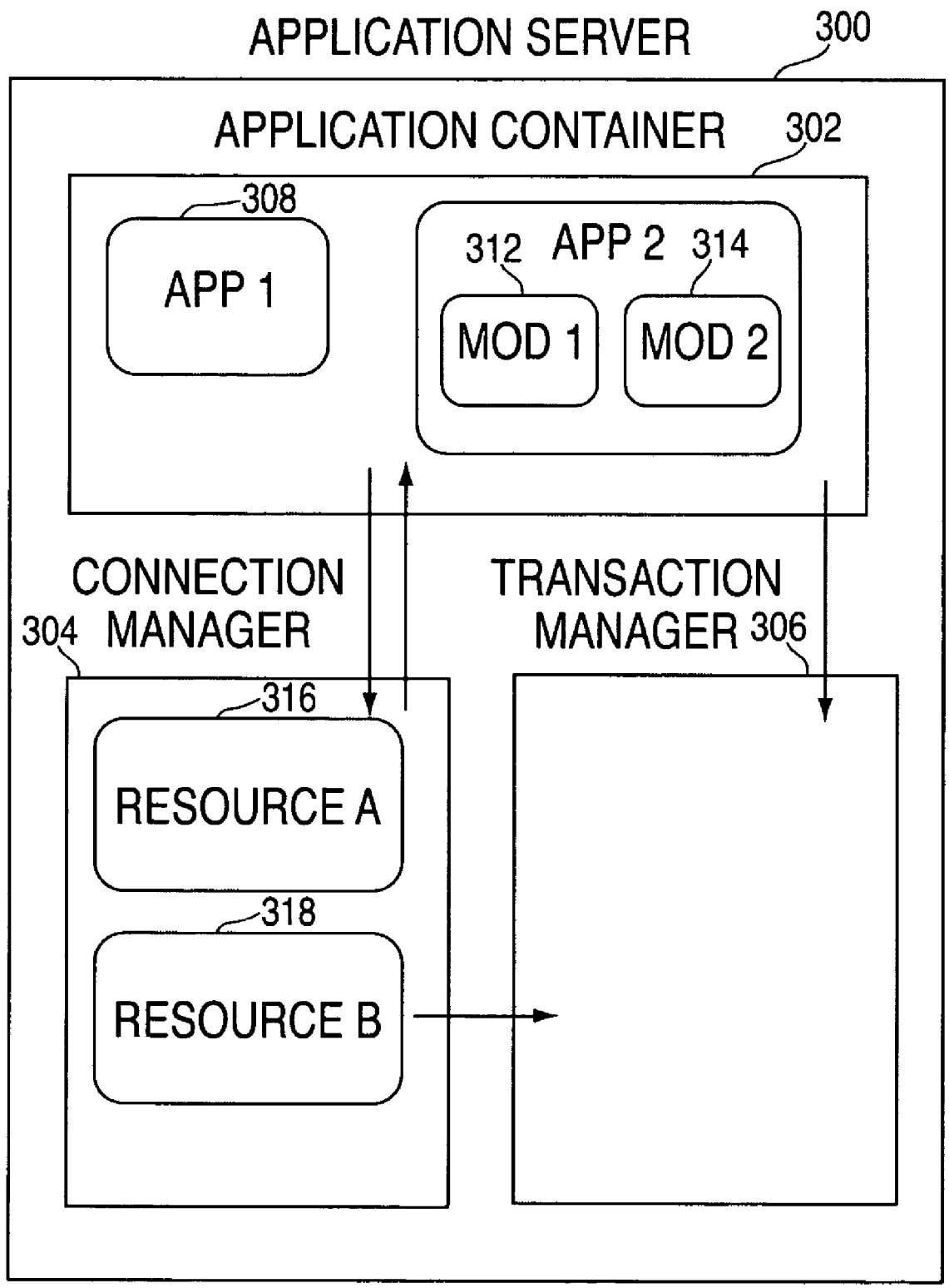
FIG. 3 is a block diagram of an exemplary embodiment of a transactional system.

FIG. 3 shows an exemplary embodiment of a transactional system. An application server 300 includes an application container 302, a connection manager 304, and a transaction manager 306. An application server, such as application server 300, is any general-purpose computer.

The application container 302 holds a first application 308 and a second application 310. An application container, such as application container 302 is where a user can deploy an application to run. An application container is a managed environment where an application has certain services available to it, such as connection management and transaction management. Depending on how the managed environment is defined, the applications can have varying granularity, such as at the component level. In this example, the first application 308 is a standalone application, while the second application 310 includes a first module 312 and a second module 314.

The connection manager 304 includes a first resource (A) 316 and a second resource (B) 318.

The transaction manager 306 collects the votes from the resources and determines the outcome. The transaction manager 306 is responsible for ordering resources, which is transparent to the applications 308, 310. An exemplary embodiment for dynamically reordering resource participation in a two-phase commit to heuristically optimize for last-agent optimization resides in the transaction manager 306. Usage statistics are stored in the transaction manager 306 utilizing a hash map, in this exemplary embodiment. In other exemplary embodiments, usage statistics are stored in any storage device accessible to the transaction manager 306.

Suppose the first resource 316 is a savings account and the second resource 318 is a checking account. Also, suppose the first module 312 in the second application 310 performs a balance inquiry for the savings account, which is a read-only operation and the second module 314 performs a withdrawal from the checking account, which modifies that resource. In this scenario, it is desirable to order the resources 316, 318 based on usage statistics so that the read-only transaction (balance inquiry) occurs first and the modifying transaction (withdrawal) occurs last.

In order for the transaction manager 306 to order the resources using last-agent optimization, the transaction manager 306 needs to know a priori how the resources will vote when they are driven for prepare. In some systems, it may be possible for the system administrator to provide deployment hints to the transaction manger to indicate how a particular resource will behave. This allows a transaction manager 306 to order those resources that are likely to vote read-only before those which never vote read-only. However, this requires the system administrator to have this information available and requires all applications using this resource to use it in a similar fashion, as multiple applications may make use of the same resource in different ways, thus requiring multiple configurations for the same resource. For some installations, this is impractical, since workload patterns may exhibit changes over time, even when the configuration of the system has not changed.

Figure 4:
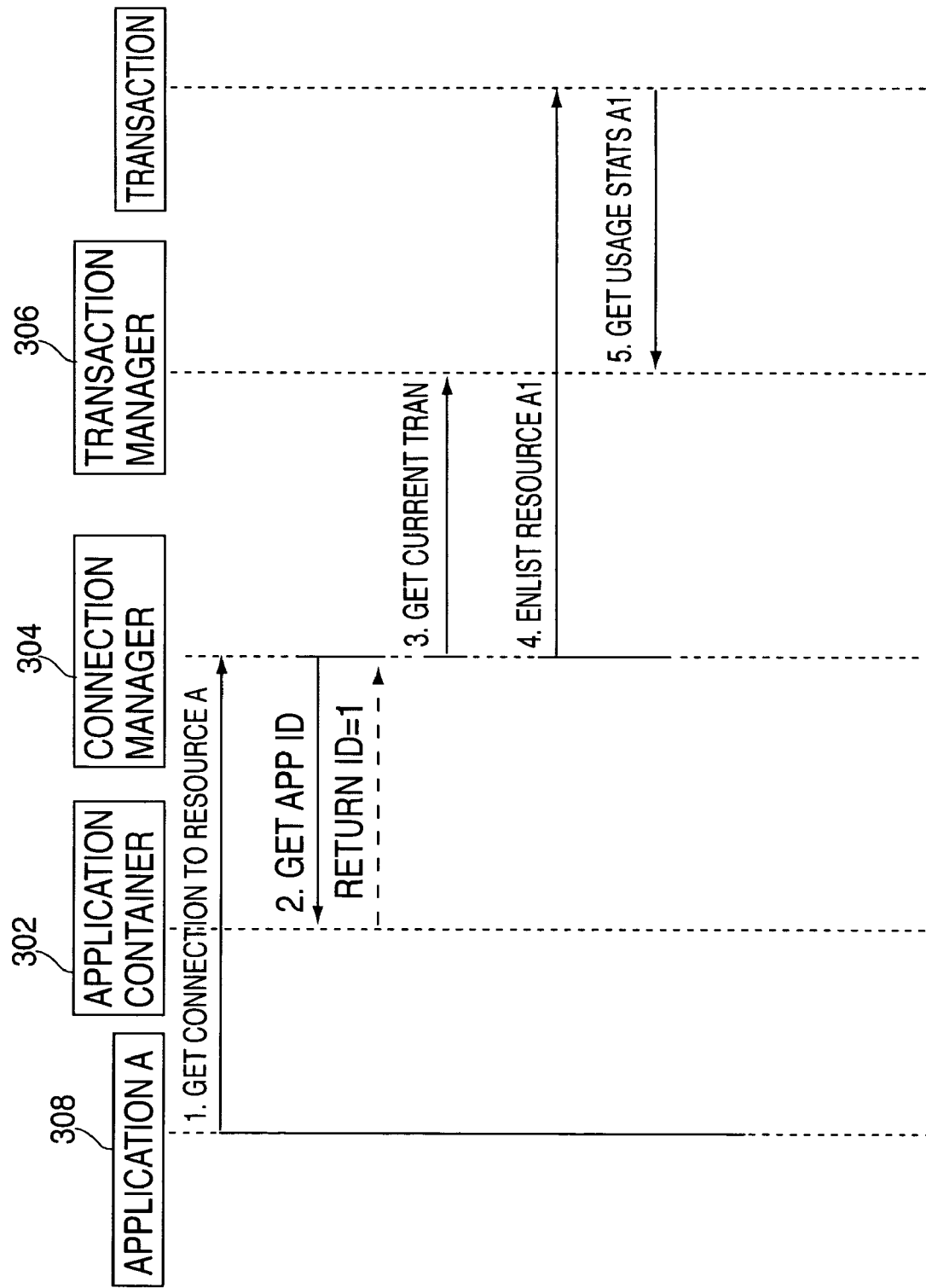
FIG. 4 is a data flow diagram of an exemplary embodiment of a process for enlisting a resource with a current transaction.

FIG. 4 shows an exemplary embodiment of a process for enlisting a resource with a current transaction. In the first step, the first application 308 inside the application container 302 is calling the connection manager 304 to establish a connection to a resource, such as a relational database that holds an account at a bank. In the second step, the connection manager 304 calls the application container 312 to retrieve an application identifier (ID). The application identifier is the identifier that the first application 308 is deployed with inside the application container 302. In response, the application container 312 returns an ID=1. The connection manager 304 checks with the transaction manager 306 to determine if the first application 308 has a transactional context, in step three. It does, so the connection manager 304 enlists the first resource (A) 316, in step four. In step five, the current transaction checks with the transaction manager 306 for the usage statistics that have been generated so far for the first resource (A) 316 and returns back to the connection manager 304.

In this example, "A1" is a combination of the application name (application "1") and the resource names (resource "A"). Other exemplary embodiments may use any other unique identifiers. In FIG. 3, the second application 310 has two components, the first module 312 and the second module 314. In order to track the correct usage statistics for a particular application and a particular resource, it is not sufficient to indicate that the second application 310 is using the first resource 316. Instead, the transaction manager 306 checks with the container manager 304 to determine which the component is currently running. In this case, it is the first application 308. Then, when the connection manager 304 is enlisting the first resource 316, the connection manager 304 passes both application ID "1" and resource ID "A" to the transaction. The transaction concatenates them to produce "A1" in order to determine usage statistics for the correct component. The granularity of the components depends on the application container 302, which maintains a list of IDs and the ID of the application currently running. For example, in a Java 2 Platform, Enterprise Edition (J2EE) server, applications are broken down into modules and modules are broken down into components, i.e., three levels of granularity. In other exemplary embodiments, there may be more or less levels of granularity.

Figure 5:
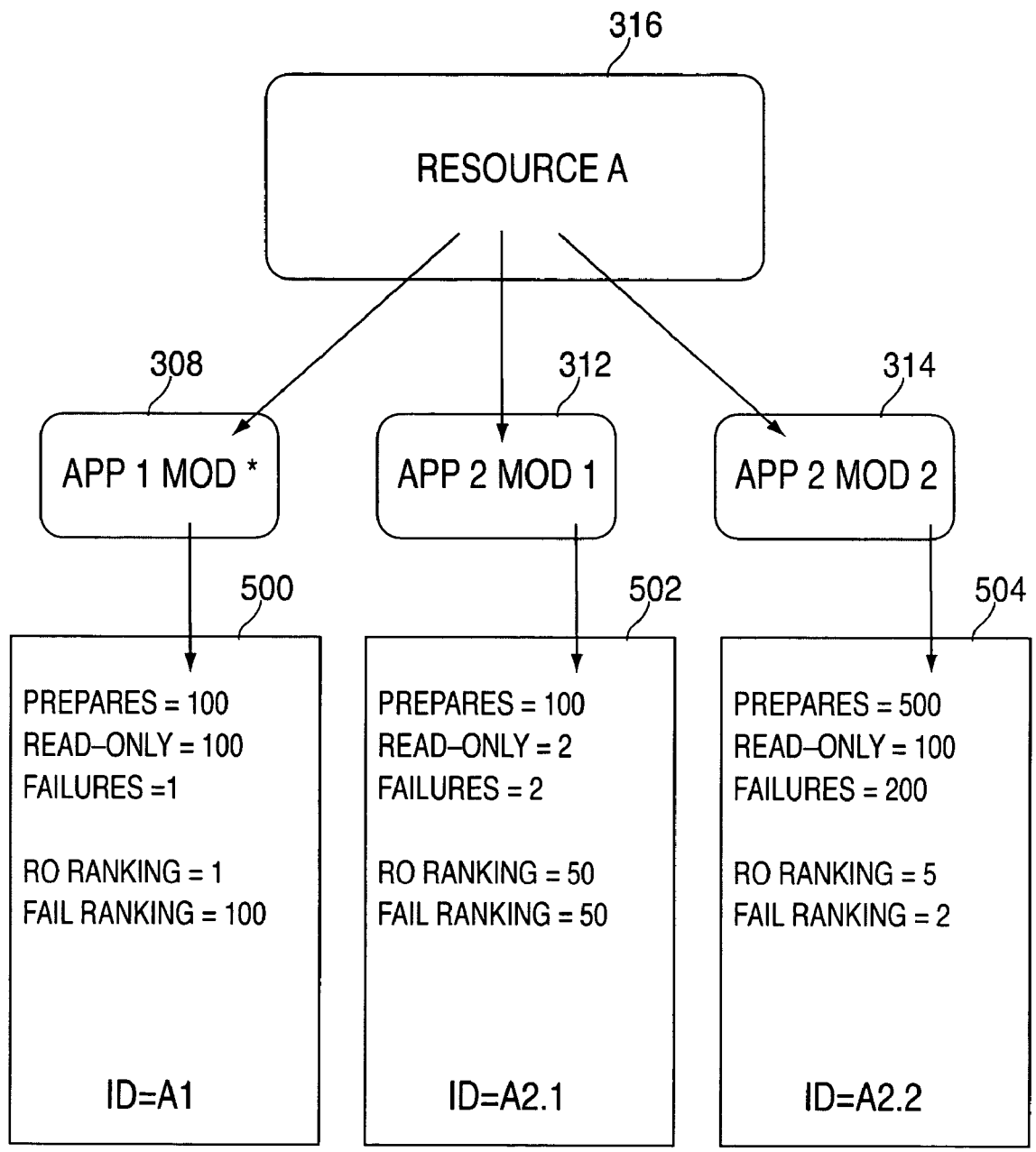
FIG. 5 is a logical diagram illustrating how an exemplary embodiment tracks usage statistics for a resource across multiple applications.

FIG. 5 illustrates how an exemplary embodiment tracks usage statistics for a resource across multiple applications. For the first resource (A) 316, there are usage statistics for three components, the first application 308 (ID=A1), the first module 312 of the second application 310 (ID=A2.1), and the second module 314 of the second application 310 (ID=A2.2).

The resource statistics for each of these components 500, 502, 504 include counts for prepare, read-only, and failures as well as rankings for read-only (RO) and failures. The read-only ranking=number of prepares/number of read-onlys. A read-only ranking of 1 is the highest possible ranking, indicating a vote of read-only every time. The fail ranking=number of prepares/number of failures, where a failure indicates that the remote resource manager encountered some sort of exceptional condition during the prepare, such as throwing a XAException. Here, the fail ranking of 100 is the highest possible ranking for ID=A1, because it is the same as the number of prepares (prepares=100) for ID-A1.

Figure 6:
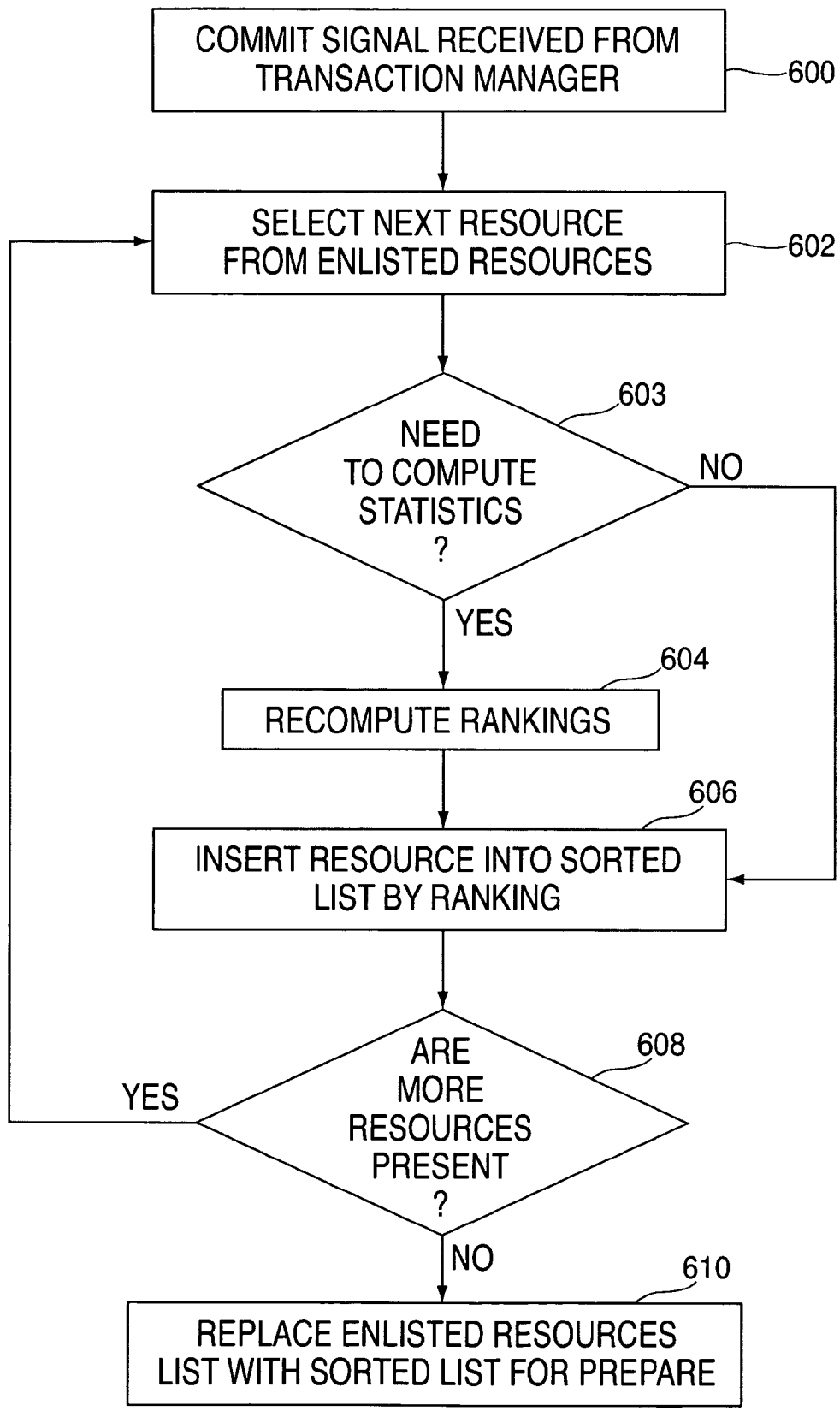
FIG. 6 is a flow chart of an exemplary embodiment for optimizing resource ordering for a prepare process.

FIG. 6 shows an exemplary embodiment for optimizing resource ordering for a prepare process. This exemplary embodiment includes determining how to order the resources enlisted in a transaction such that the resulting ordering produces the last-agent optimization described above. The method dynamically orders the resources with no intervention required by the system administrator.

In this exemplary embodiment, in order to predict the future behavior of a resource, the past behavior of each resource is tracked in a histogram. The histogram is a table stored in memory, a table of usage and a history. When a situation occurs, the table is searched to see if it has occurred before. The histogram keeps a record of how often a resource votes read-only or fails to complete the prepare phase for a given system and situation. The transaction manager uses this information to predict how a resource is likely to behave in the current transaction and orders the resources such that those resources that are likely to vote read-only are driven first. This increases the frequency at which a last-agent optimization can be performed.

In this exemplary embodiment, the histogram includes a mapping of resource instances to usage statistics. In the usage statistics, several counters are maintained. One counter represents the total number of times this resource has been prepared. Another counter represents the total number of times this resource has voted read-only. Another counter represents the total number of times this resource threw an exception during the prepare phase. Using these counters, a resource instance is ranked by how often it votes read-only relative to the total number of prepares and how often it fails to complete the prepare relative to the total number of prepares.

In another exemplary embodiment, an application server is running on a general-purpose computer. The application server includes a container, a connection manager, and a transaction manager. Inside the container, one or more applications are deployed and running. The connection manager is responsible for supplying resource instances to applications running in the container and enlisting those resources with the transaction manager. The transaction manager is responsible for creating transactional boundaries for applications running in the container, providing atomic outcomes for the resources enlisted in a transactional boundary, and ordering the resources during the commit phase.

In this exemplary embodiment, when an application is deployed, it is assigned an application ID. This application ID is further broken down into components within the application, depending on how the application is constructed. Each component within the application is also assigned an ID based on the overall ID of the application. Each component within the application provides deployment metadata describing the transactional semantics of the component. The metadata describes whether the component should run within a transaction and whether the component should join a transaction that may already be running when it is entered.

In this exemplary embodiment, when an application is driven, the container checks the metadata for the component and informs the transaction manager of the transactional context required for this request. The application code is then executed. When the application requires the use of a resource (e.g., a portion of a relational database) the application requests a connection through the connection manager. The connection manager checks the current transactional context and, if a transaction is present, the connection manager passes the resource and the ID for the component currently being executed to the transaction manager. The transaction manager receives the resource instance and converts it into an identifier that is concatenated with the ID for the component to produce an identifier representing both the resource and the component using the resource.

In this exemplary embodiment, there is a histogram implemented as a hash map that maps the identifier to a set of usage statistics. By concatenating the component ID and the resource ID together, we have multiple sets of usage statistics for each resource, one set per component using the resource. The usage statistics are combined with the resource instance and are enlisted together in the current transaction. Then, the connection manager returns a connection to the resource back to the application code.

In this exemplary embodiment, the usage statistics include a read-only ranking that is generated using dividing the total number of prepares by the total number of read-only votes. A resource that votes read-only 100% of the time has a ranking value of 1, which is the best possible ranking for optimization. A resource that votes read-only 0% of the time has a ranking equal to the total number of times that it has been prepared. A failure ranking is determined by dividing the total number of prepares by the total number of failures or exceptions. A resource with a high ranking is sorted before one with a low ranking. A resource that fails 100% of the time has a ranking of one.

In some embodiments, all the counters are initialized to one to prevent division by zero, when computing the rankings. In some embodiments, the counters and rankings are reset at a specified time interval, when changes are made to allow configuration changes to be reflected in the usage statistics quickly, or on any other appropriate time schedule. In some embodiments, if the prepare counter reaches a maximum value for the system, the rankings and counters are reset.

In some embodiments, the rankings are only computed at specified intervals. In some embodiments, for the first 100 prepares, ranking are computed every time the total number of prepares is incremented. For the next 100 prepares, the ranking are computed every ten times the total number of prepares is incremented. For the next 10,000 prepares, the rankings are computed every 100 times prepare is incremented. For all remaining prepares, the rankings are computed every 1000 times prepare is incremented, in some embodiments.

In this exemplary embodiment, the usage statistics are encapsulated in an object that is inserted into a sorted list. The sorted list receives one of two comparator objects. Comparator objects sort the usage statistics based on read-only ranking or failure ranking.

In this exemplary embodiment, when the component has finished execution, the container again checks the metadata for the component to determine whether the current transaction context has ended. If the transaction context ended, the container contacts the transaction manager to complete the transaction. The transaction manager sorts the resources enlisted in the transaction based on the associated usage statistics object. A read-only comparator places resources with low read-only rankings at the beginning of the list.

In this exemplary embodiment, the transaction manager drives prepare on each resource based on its ranking. When prepare is driven, the prepare counter for the resource is incremented. As a resource votes read-only, the read-only counter for that resource is incremented and that resource is removed from the list of resources enlisted in the transaction. After all the votes, if a single resource remains enlisted, the last agent optimization is performed to finish the transaction. If a resource votes okay in response to a prepare call, the comparator for the list is switched to the failure comparator, sorting the remaining elements by their failure ranking, so that resources that are likely to fail are driven first. If a resource fails, prepare does not need to be driven on the remaining resources because the outcome is now rollback. Ordering resources which are likely to fail before those which are unlikely to fail offers the additional savings of several prepare flows across the network in the case of an actual failure, however this should only be done when a only-agent optimization is no longer possible. The two-phase commit then continues with the remaining resources. If a resource fails, its failure count is incremented and the prepare phase is skipped for the remaining resources, because the resources will be rolled back.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, future improvements or changes to standards may be used with minor adaptations of various embodiments of the present invention. Furthermore, various components may be implemented in hardware, software, or firmware or any combination thereof. Finally, many modifications may be made to adapt a particular situation or material to the teachings of the invention without departing from the essential scope thereof. Therefore, it is intended that the invention is not to be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for last-agent optimization, comprising:
   establishing a connection to each resource in a plurality of resources for an application;
   determining a current transactional context from metadata for a component of the application;
   gathering usage statistics associated with each resource;
   heuristically determining an order of each resource in the current transactional context to achieve last-agent optimization based at least in part on the usage statistics, wherein the usage statistics associated with each resource include a read-only ranking and a fail ranking representative of the number of failures in executing the application;

driving a prepare on each resource based on the read-only ranking associated with that resource;

enlisting each resource in a list of enlisted resources;

removing a read-only resource from the list of enlisted resources for the current transactional context; and performing last-agent optimization for a single enlisted resource.

2. The method of claim 1, wherein the usage statistics associated with each resource include at least one counter selected from: a number of times this resource has been prepared, a number of times this resource has voted read-only, and a number of times this resource failed.

3. The method of claim 2, further comprising:

retrieving an application identifier associated with the application;

wherein a hash map maps the application identifier to the usage statistics for that application.

4. The method of claim 2, wherein the at least one counter is periodically reset.

5. The method of claim 1, wherein the read-only ranking and the fail ranking are determined at select intervals.

6. The method of claim 1, wherein the usage statistics are encapsulated in an object that is inserted into a sorted list.

7. A computer system including a processor for last-agent optimization, comprising: an application server running on a general-purpose computer a histogram for holding usage statistics and history information for each resource in a plurality of resources, wherein the usage statistics associated with each resource include a read-only ranking and a fail ranking representative of the number of failures in executing an application; and a transaction manager for ordering each resource in a current transaction based at least in part on the histogram so that read-only resources are prepared first and a sole non-read-only resource is committed without being prepared;

the transaction manager:

driving a prepare on each resource based on the read-only ranking associated with that resource;

enlisting each resource in a list of enlisted resources;

removing a read-only resource from the list of enlisted resources for the current transactional context; and performing last-agent optimization for a single enlisted resource.

8. The system of claim 7, wherein the transaction manager heuristically determines the order of each resource in the current transaction to achieve last-agent optimization.

9. A computer system including a processor for last-agent optimization, comprising:

an application server running on a general-purpose computer;

a container hosted on the server;

at least one application running in the container, the application including at least one transaction using a plurality of resources;

a transaction manager on the server for heuristically ordering the resources during a commit phase of a two-phase commit process to achieve last-agent optimization; and a connection manager on the server for supplying the resources to the application and for enlisting the resources with the transaction manager;

the transaction manager:

driving a prepare on each resource based on a read-only ranking associated with that resource;

enlisting each resource in a list of enlisted resources;

removing a read-only resource from the list of enlisted resources for the current transactional context; and performing last-agent optimization for a single enlisted resource; wherein the transaction manager orders the resources based on dynamic usage statistics, wherein the usage statistics associated with each resource include a read-only ranking and a fail ranking representative of the number of failures in executing an application.

10. The system of claim 9, wherein the transaction manager creates transactional boundaries for the application.

11. The system of claim 10, wherein the transaction manager provides atomic outcomes for the resources enlisted in a transactional boundary.

12. The system of claim 9, wherein the usage statistics are stored in a hash map.

13. The system of claim 9, wherein the transaction manager orders the resources based on history information.

14. The system of claim 9, wherein the transaction manager orders the resources so that any resource likely to vote read-only in response to a prepare call are placed before other resources.

15. A storage medium storing instructions when executed by a processor for performing a method for last-agent optimization, comprising:

storing usage statistics in a histogram, wherein the usage statistics associated with each resource include a read-only ranking and a fail ranking representative of the number of failures in executing an application;

ordering a plurality of resources in a current transactional context using the histogram to achieve last-agent optimization;

adjusting the ordering autonomically to changes in usage;

driving a prepare on each resource based on the read-only ranking associated with that resource;

enlisting each resource in a list of enlisted resources;

removing a read-only resource from the list of enlisted resources for the current transactional context; and performing last-agent optimization for a single enlisted resource.

* * * * *